US008706965B2

(12) United States Patent
Piry et al.

(10) Patent No.: US 8,706,965 B2
(45) Date of Patent: Apr. 22, 2014

(54) APPARATUS AND METHOD FOR HANDLING ACCESS OPERATIONS ISSUED TO LOCAL CACHE STRUCTURES WITHIN A DATA PROCESSING APPARATUS

(75) Inventors: Frederic Claude Piry, Cagnes-sur-Mer (FR); Louis-Marie Vincent Mouton, Vallauris (FR); Luca Scalabrino, Biot (FR)

(73) Assignee: ARM Limited, Cambridge (GB)

( * ) Notice: Subject to any disclaimer, the term of this patent is extended or adjusted under 35 U.S.C. 154(b) by 377 days.

(21) Appl. No.: 13/067,491

(22) Filed: Jun. 3, 2011

(65) Prior Publication Data

US 2011/0314224 A1 Dec. 22, 2011

(30) Foreign Application Priority Data

Jun. 16, 2010 (GB) .................................. 1010114.5

(51) Int. Cl.
*G06F 12/00* (2006.01)
(52) U.S. Cl.
USPC .......................................... 711/118; 711/145
(58) Field of Classification Search
USPC .......................................................... 711/118
See application file for complete search history.

(56) References Cited

U.S. PATENT DOCUMENTS

| 5,778,429 | A | 7/1998 | Sukegawa et al. | |
|---|---|---|---|---|
| 6,088,771 | A * | 7/2000 | Steely et al. | 711/154 |
| 6,766,424 | B1 | 7/2004 | Wilson | |
| 6,996,812 | B2 * | 2/2006 | McKenney | 717/138 |
| 7,653,789 | B2 * | 1/2010 | Wright et al. | 711/145 |

| 2003/0009643 | A1 | 1/2003 | Arimilli et al. | |
|---|---|---|---|---|
| 2006/0004967 | A1 | 1/2006 | Mithal et al. | |
| 2007/0180197 | A1 | 8/2007 | Wright et al. | |
| 2008/0189522 | A1 * | 8/2008 | Meil et al. | 712/220 |

(Continued)

FOREIGN PATENT DOCUMENTS

WO WO 2010/038301 4/2010

OTHER PUBLICATIONS

International Search Report and Written Opinion of the International Searching Authority mailed Sep. 14, 2011 in PCT/GB2011/050902.

(Continued)

*Primary Examiner* — Reginald Bragdon
*Assistant Examiner* — Hannah A Faye-Joyner
(74) *Attorney, Agent, or Firm* — Nixon & Vanderhye P.C.

(57) ABSTRACT

An apparatus and method are provided for handling access operations issued to local cache structures within a data processing apparatus. The data processing apparatus comprises a plurality of processing units each having a local cache structure associated therewith. Shared access coordination circuitry is also provided for coordinating the handling of shared access operations issued to any of the local cache structures. For a shared access operation, the access control circuitry associated with the local cache structure to which that shared access operation is issued will perform a local access operation to that local cache structure, and in addition will issue a shared access signal to the shared access coordination circuitry. For a local access operation, the access control circuitry would normally perform a local access operation on the associated local cache structure, and not notify the shared access coordination circuitry. However, if an access operation extension value is set, then the access control circuitry treats such a local access operation as a shared access operation. Such an approach ensures correction operation even after an operating system and/or an application program are migrated from one processing unit to another.

19 Claims, 9 Drawing Sheets

(56) References Cited

U.S. PATENT DOCUMENTS

| | | |
|---|---|---|
| 2009/0292881 A1 | 11/2009 | Sivaramakrishnan et al. |
| 2010/0161922 A1* | 6/2010 | Sharp et al. ............... 711/162 |
| 2011/0161947 A1* | 6/2011 | Ashok et al. ............... 717/168 |
| 2011/0185128 A1* | 7/2011 | Ukai et al. ................. 711/146 |

OTHER PUBLICATIONS

"Caching Scheme for Managing Task Migration Sharing" IBM Technical Disclosure Bulletin, vol. 34, No. 2, Jul. 1991, pp. 144-145.

UK Search Report dated Sep. 21, 2010 for GB1010114.5.

* cited by examiner

APPARATUS AND METHOD FOR HANDLING ACCESS OPERATIONS ISSUED TO LOCAL CACHE STRUCTURES WITHIN A DATA PROCESSING APPARATUS

This application claims priority to GB Application No. 1010114.5, filed 16 Jun. 2010, the entire contents of which is hereby incorporated by reference.

FIELD OF THE INVENTION

The present invention relates to an apparatus and method for handling access operations issued to local cache structures within a data processing apparatus, in particular where the data processing apparatus provides a plurality of processing units each having such a local cache structure.

BACKGROUND OF THE INVENTION

It is known to provide multi-processing systems in which two or more processing units, for example processor cores, share access to shared memory. Such systems are typically used to gain higher performance by arranging the different processor cores to execute respective data processing operations in parallel.

To further improve speed of access to data within such a multi-processing system, it is known to provide each of the processing units with at least one local cache structure in which to store a subset of the data held in the shared memory. Such local cache structures can take a variety of forms, for example a data cache used to store data processed by the processing units, an instruction cache used to store instructions for execution by the processing units, a translation lookaside buffer (TLB) used to store page table information used when translating virtual addresses issued by the processing unit to physical addresses, etc.

Within a multi-processing system, applications may be migrated from one processing unit to another. As a result, there is the possibility that data used by an application when executing on one processing unit may remain cached in the local cache structure of that processing unit after the application has been migrated to another processing unit. Whilst it is known to provide coherency mechanisms to keep track of data retained in the various local cache structures, with the aim of ensuring that a processing unit will always access the most up-to-date version of the data, instances can still arise where operations performed on one or more entries of a local cache structure may not cause corresponding operations to be performed on data held in a local cache structure of another processing unit, when the performance of such operations would be appropriate. One example of such an instance is the performance of cache maintenance operations.

Often, cache maintenance operations are issued by an operating system to update the state of one or more entries in the local cache structure. If the operating system is not fully aware of the plurality of processing units provided by the data processing apparatus, as for example may be the case if the operating system is a mono-processor operating system shielded from the hardware platform by a hypervisor software layer, then it may issue a cache maintenance operation which will only be performed in respect of the local cache structure associated with the processing unit on which the operating system is running, even though data to which that cache maintenance operation would be applicable may be stored in the local cache structure of another processing unit. Purely by way of example, consider the situation where the cache maintenance operation identifies that any cached entries for a particular address range, or for a particular process identifier (process ID), should be invalidated. When that operation is performed in respect of the local cache structure of the processing unit on which the operating system is currently running, then such a cache maintenance operation will correctly invalidate any entries cached in that local cache structure that fall within the specified address range, or are associated with the specified process ID. However, no action will be taken in respect of the data held in a corresponding local cache structure of any of the other processing units. As mentioned earlier, these may in fact still retain data that was intended to be the subject of such a cache maintenance operation, but due to the operating system not being aware of the hardware architecture, those entries will not be subjected to the cache maintenance operation.

Whilst this problem will not only occur when hypervisor software is used, the problem is often likely to occur when a hypervisor software layer is used. In particular, the multi-processing system may execute hypervisor software to support the execution of at least one virtual machine on the processing circuitry, each virtual machine comprising an operating system running one or more application programs. In such an environment, both the operating system and the one or more application programs need have no knowledge of the underlying hardware platform, and in particular will not necessarily be aware that a multi-processing system is being used. The application programs and/or the operating system may hence issue cache maintenance operations that assume a mono-processor environment, and hence are likely to give rise to the earlier-mentioned problem.

One way to address such a problem would be for the hypervisor to perform a variety of cache maintenance operations at the time the operating system and/or applications are migrated (also referred to herein as "switched") from one processing unit to another. For example, the hypervisor could extensively perform data cache clean and invalidate operations, instruction cache invalidate operations, TLB invalidate operations, etc before the switched operating system and/or application program is allowed to begin operation on the new processor core. However, whilst such an approach would address the problem, it significantly impacts performance, and in particular prevents the potential benefits of using a multi-processing platform from being realised.

An alternative approach might be for the hypervisor software, when migrating the operating system and/or applications from a source processing unit to a destination processing unit, to mark the source processing unit as being likely to be a target for some of the operations that will later be performed on the destination processor. The hypervisor would then have to further program the destination processor so as to trap any such operations when they are encountered, so that the hypervisor will then get notified when such operations are issued. At that time, the hypervisor software would then decide whether such operations also need to be performed on the source processor as well as the destination processor. However, a significant drawback of such an approach is the need to trap operations performed on the destination processor. This gives rise to a significant performance penalty, because the hypervisor software is called more often than required. In particular, if the trapping functionality is not designed on a fine grain basis, the hypervisor software may be called for a lot of operations where no action is required in connection with the source processor. There is also a significant complexity issue, as the hypervisor software needs to understand the operations in order to decide if they need to be performed on the source processor as well as the destination processor, or not.

Accordingly, it would be desirable to provide an improved technique for handling access operations issued to local cache structures within a data processing system having a plurality of processing units, each of which have such a local cache structure.

SUMMARY OF THE INVENTION

Viewed from a first aspect, the present invention provides a data processing apparatus comprising: processing circuitry comprising a plurality of processing units for performing data processing operations requiring access to data in shared memory; each processing unit having a local cache structure associated therewith for storing a subset of said data for access by that processing unit, and access control circuitry for handling access operations issued to the local cache structure, at least one type of access operation to the local cache structure being issued as a local access operation or a shared access operation; a configuration storage for storing an access operation extension value; shared access coordination circuitry for coordinating the handling of said shared access operation by said plurality of processing units; on receipt of said shared access operation, the access control circuitry issuing a shared access signal to the shared access coordination circuitry in addition to performing the local access operation to the associated local cache structure; on receipt of said local access operation, the access control circuitry being arranged, if the access operation extension value is not set, to perform the local access operation to the associated local cache structure without issuing the shared access signal to the shared access coordination circuitry, and being arranged, if the access operation extension value is set, to treat the local access operation as said shared access operation.

In accordance with the present invention, certain types of access operation may be issued as local access operations or shared access operations. A configuration storage is then provided for storing an access operation extension value, with the manner in which local access operations are handled being dependent on whether that access operation extension value is set or not. When a shared access operation is received by access control circuitry associated with a local cache structure, then the value of the access operation extension value is not relevant, and the access control circuitry will merely perform a local access operation to the associated local cache structure and in addition send a shared access signal to shared access coordination circuitry. The shared access coordination circuitry will then broadcast a signal to the other processing units to cause the local access operation to also be performed in respect of their associated local cache structures, or alternatively will determine having regards to some state retained by the shared access coordination circuitry a subset of the processing units to which to send such a signal to.

When the access control circuitry receives a local access operation, then if the access operation extension value is not set, the access control circuitry merely performs the local access operation to the associated local cache structure. However, if the access operation extension value is set, then in accordance with the present invention, even though only a local access operation has been received, the access control circuitry treats the local access operation as a shared access operation.

By such an approach, it will be appreciated that the above-described problems are alleviated. In particular, once the access operation extension value has been set, local access operations will be treated as shared access operations and hence it does not matter if the entity causing that local access operation to be issued has no knowledge of the structure of the multi-processing system, or the possibility that the data it is trying to target may actually be stored in a local cache structure of another processing unit.

Further, the approach of the present invention significantly improves performance and reduces complexity when compared with the earlier-described mechanisms, since the performance benefits of running on a multi-processing platform are retained. Further, in embodiments where hypervisor software is used, there is no need to trap any local access operations, nor is there any need for the hypervisor software to understand the operations in order to decide how such trapped operations should be processed.

Once the access operation extension value has been set, then it may in one embodiment cause all subsequent local access operations to be treated as shared access operations, irrespective of their source. However, in an alternative embodiment, the software executing on the processing circuitry consists of a plurality of hierarchical levels of software, the access operation extension value is set and unset by software executing at a predetermined hierarchical level, and the access control circuitry is only responsive to the access operation extension value when handling local access operations issued by software at a lower hierarchical level than said predetermined hierarchical level. Hence, by way of example, considering an embodiment where hypervisor software is used, the hypervisor software may form a highest hierarchical level, an operating system may form a lower hierarchical level, and the application programs running on that operating system may form an even lower hierarchical level. If the access operation extension value is set by the hypervisor level, then any local access operations issued by the operating system or the application programs will be treated as shared access operations, whilst the hypervisor software can continue to issue local access operations that are handled as local access operations. This may be useful, for example, where the operating system is a mono-processor operating system, and hence is unaware of the multi-processing nature of the processing circuitry. In another example, this approach, could still be useful even if the operating system is aware of the multi-processor nature of the processing circuitry, if for example it has been optimised in a way where it knows which processor an operation should target, but this knowledge is potentially wrong in situations where the operating system is run underneath a hypervisor.

In an alternative embodiment, if the access operation extension value is set by the operating system, then any local access operations issued by the underlying application programs will be treated as shared access operations, but the operating system (and indeed any hypervisor level above the operating system) can continue to issue local access operations which are handled as local access operations by the access control circuitry.

The at least one type of access operation that can be issued as either a local access operation or as a shared access operation can take a variety of forms. In one embodiment, one such type of access operation comprises a maintenance access operation issued to update a state of data stored in at least one entry of the local cache structure. Hence, a maintenance access operation will not typically update the data itself stored in the cache structure, but instead will result in a change to the associated state held in the local cache structure in association with the data. In one particular embodiment, the maintenance access operation performs at least one of a clean operation and an invalidate operation in respect of said at least one entry of the local cache structure. A clean operation will cause any dirty and valid data to be evicted to memory, dirty data being data that is more up-to-date than the corresponding data held in memory. Such a maintenance access operation is commonly performed in association with data caches. An invalidate operation will invalidate the current contents of a specified entry in the local cache structure, for example by resetting the valid bit associated with that entry. An invalidate operation is often used in association with a variety of different local cache structures, for example an instruction cache, a data cache, a TLB, etc.

In one embodiment, the processing circuitry executes hypervisor software to support the execution of at least one virtual machine on the processing circuitry, the virtual machine being arranged to issue said at least one type of access operation. Each virtual machine will typically comprise an operating system running one or more application programs. As mentioned earlier, one use of such hypervisor software within a multi-processing system is to allow a monoprocessor aware operating system to be run on the multi-processing system, with the hypervisor software shielding the specific structure of the hardware platform from the operating system.

However, even if the operating system is multi-processor enabled, there can still be benefits to running such an operating system under the control of hypervisor software. For example, a multi-processor enabled operating system may be run under the control of hypervisor software when multiple operating systems are required to co-exist on a given multi-processor system. By such an approach two known operating systems can run concurrently on the hardware, without modification to either of these operating systems. As another example, hypervisor software is also often used in multiprocessor systems where the powering up and down of parts of the processors is under the control of the hypervisor. In such embodiments, the operating system typically will be unaware that the hardware it is running on has a different number of processors active depending on the workload. By controlling the powering up/down of the multiprocessor system in the hypervisor level, OEM vendors can provide added value, with no modification to the multiple operating systems supported being needed.

When using hypervisor software, it will typically be the case that the hypervisor software will at certain points in time move the operating system from one of the processing units to another of the processing units, such that subsequent to the move process, the operating system will then resume operation on the processing unit to which it has been moved, along with any underlying applications. In one particular embodiment, when the hypervisor software moves an operating system in such a manner, then the hypervisor software causes the access operation extension value to be set. Following setting of the access operation extension value, the access control circuitry then treats any local access operation issued by said at least one virtual machine as a shared access operation, but continues to handle local access operations issued by the hypervisor software as local access operations.

As discussed earlier, the local cache structure may take a variety of forms. In one embodiment, the local cache structure is a data cache for caching data used as operand data for said data processing operations. Alternatively, the local cache structure may comprise a translation lookaside buffer for caching page table data obtained from page tables in said shared memory and used when performing virtual to physical address translation within the associated processing unit. As another example, the local cache structure may comprise an instruction cache for caching instructions used to define said data processing operations. In yet further examples, the local cache structure may comprise a branch history buffer used to store data referenced by a branch prediction unit when predicting whether a branch will be taken or not taken, or a branch target buffer used to store the target addresses for branch instructions.

There are a number of ways in which the shared access coordination circuitry may respond to the shared access signal. In one embodiment, the shared access coordination circuitry is responsive to said shared access signal to broadcast a local access operation request to each of the processing units other than the processing unit whose access control circuitry has issued said shared access signal, whereby the local access operation is performed on each of the processing units. Hence, in such embodiments, the shared access coordination circuitry makes no attempt to determine which processing units may contain data the subject of the original shared access operation (the original shared access operation either being a shared access operation issued as such, or a local access operation upgraded to be a shared access operation by the access control circuitry due to the access operation extension value being set). Instead, the shared access coordination circuitry merely broadcasts a request to each of the processing units to cause them to perform a local access operation in respect of the data specified by the original shared access operation.

In an alternative embodiment, the shared access coordination circuitry is responsive to said shared access signal to determine a subset of processing units from said plurality of processing units whose local cache structure could contain data identified by the shared access operation, and to issue a local access operation request to each of the processing units in said subset. Such an approach is possible where the shared access coordination circuitry maintains some record of where the data has been cached, and hence knows for any particular data which local cache structures may potentially store copies of that data. This enables the requests issued by the shared access coordination circuitry to be restricted to a subset of the processing units, thereby yielding energy efficiency gains and potentially achieving better performance by reducing the number of unnecessary access operations performed.

Whilst the above described techniques of embodiments of the invention are used in association with access operations, the technique can also be used in association with other types of operation. For example, when an application program wants to ensure that a previous memory operation, for example a write operation, has been made visible to various other parts of the system, or to ensure that subsequent memory operations are ordered with respect to such a previous memory operation, then it is known for such an application program to execute a memory barrier operation in order to either enforce a given ordering of memory accesses, or ensure that the results of the previous memory operation have been made visible. However, if the application program has been migrated from one processing unit to another between the memory operation in question and the memory barrier operation, then there is the potential that the memory barrier operation will not achieve its intended purpose. However, in accordance with one embodiment, on execution of a memory barrier operation by a first one of said processing units, said first one of said processing units is arranged, if said access operation extension value is set, to issue a memory barrier signal to cause said memory barrier operation to be executed on at least one other of said processing units.

A dedicated propagation path may be provided for the memory barrier signal to cause the other processing units to be advised of the memory barrier signal and hence the need to locally perform a memory barrier operation. However, in one embodiment, the first one of said processing units issues said memory barrier signal to said shared access coordination circuitry to cause said memory barrier operation to be executed on said at least one other of said processing units. Hence, in such embodiments, the shared access coordination circuitry is re-used to manage the propagation of the memory barrier operation to the required processing units.

The shared access coordination circuitry can take a variety of forms. However, in one embodiment the shared access coordination circuitry comprises cache coherency circuitry employing a cache coherency protocol to ensure that said data accessed by each processing unit is up-to-date.

In one embodiment, a single access operation extension value may be provided for the entire system. However, in an alternative embodiment, the configuration storage stores a separate access operation extension value for each processing unit in said plurality of processing units, and the access control circuitry references its associated access operation extension value when handling the local access operation. In one such embodiment, the configuration storage may be provided by some central storage, or alternatively separate storage may be provided in each processing unit which collectively forms the configuration storage, such that the relevant access operation extension value is stored locally to each processing unit.

The plurality of processing units can take a variety of forms, in one embodiment each of the processing units comprising a processor. The processors do not all need to be identical, but in one embodiment the plurality of processors form a symmetric multi-processing (SMP) processing circuit.

Viewed from a second aspect, the present invention provides a method of handling access operations issued to local cache structures within a data processing apparatus, the data processing apparatus having a plurality of processing units for performing data processing operations requiring access to data in shared memory, each processing unit having a local cache structure associated therewith for storing a subset of said data for access by that processing unit, the method comprising: providing shared access coordination circuitry for coordinating the handling of a shared access operation by said plurality of processing units; storing an access operation extension value; when handling said shared access operation issued to one of the local cache structures, issuing a shared access signal to the shared access coordination circuitry in addition to performing a local access operation to said one of the local cache structures; when handling a local access operation issued to one of the local cache structures: (i) if the access operation extension value is not set, performing the local access operation to said one of the local cache structures without issuing the shared access signal to the shared access coordination circuitry, and (ii) if the access operation extension value is set, treating the local access operation as said shared access operation.

Viewed from a third aspect, the present invention provides a data processing apparatus comprising: processing means circuitry comprising a plurality of processing unit means for performing data processing operations requiring access to data in shared memory; each processing unit means having local cache structure means associated therewith for storing a subset of said data for access by that processing unit means, and access control means for handling access operations issued to the local cache structure means, at least one type of access operation to the local cache structure means being issued as a local access operation or a shared access operation; configuration storage means for storing an access operation extension value; shared access coordination means for coordinating the handling of said shared access operation by said plurality of processing unit means; on receipt of said shared access operation, the access control means for issuing a shared access signal to the shared access coordination means in addition to performing the local access operation to the associated local cache structure means; on receipt of said local access operation, the access control means, if the access operation extension value is not set, for performing the local access operation to the associated local cache structure means without issuing the shared access signal to the shared access coordination means, and, if the access operation extension value is set, for treating the local access operation as said shared access operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
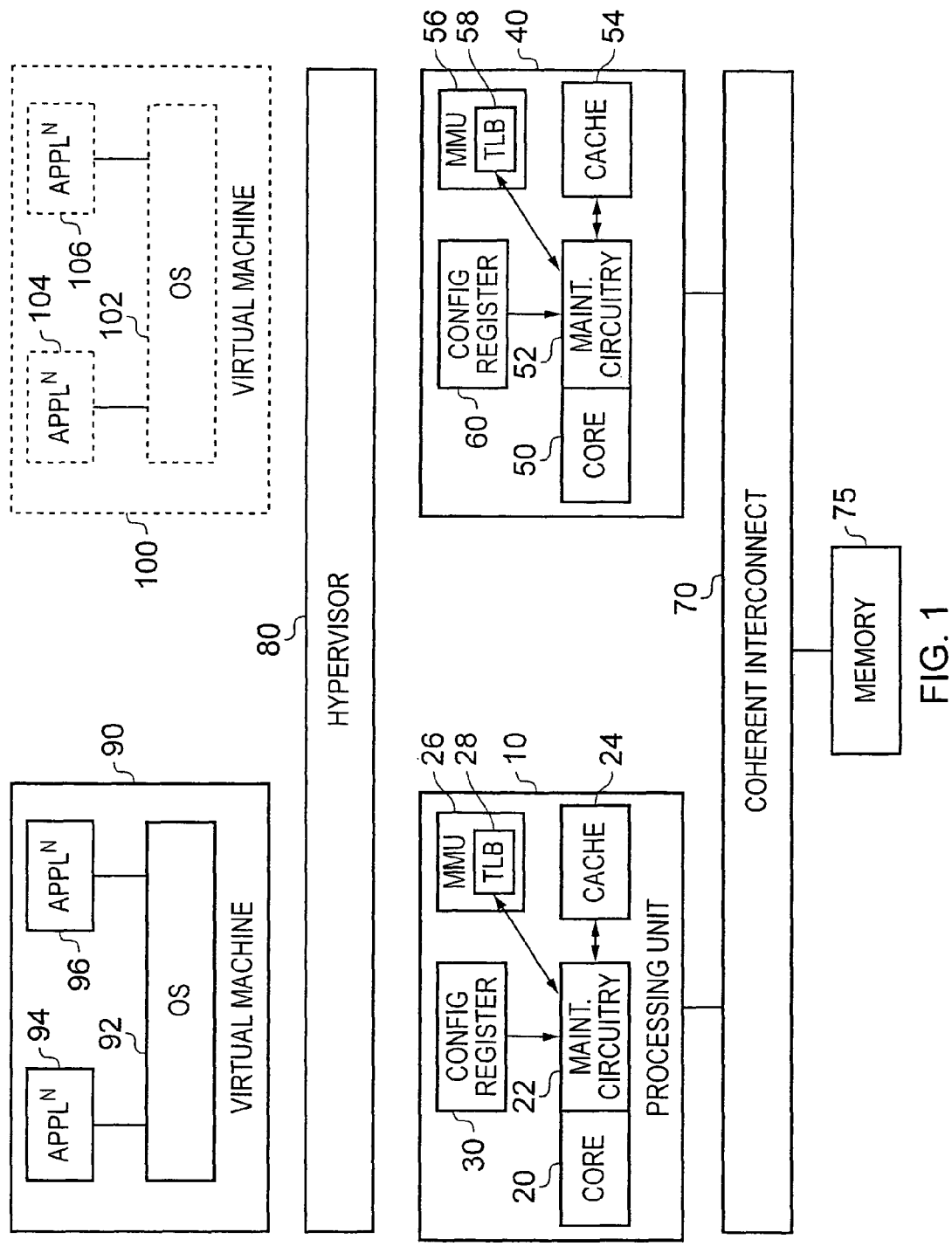
FIG. 1 is a diagram schematically illustrating a multi-processing system in accordance with one embodiment.

FIG. 1 illustrates a multi-processing system in accordance with one embodiment. A plurality of processing units 10, 40 are provided, in the illustrated example both processing units being processors comprising a processor core, and associated local cache structures. Whilst the processors do not need to be identical, in one embodiment the processors are identically structured, and form an SMP system. As shown, the first processing circuit 10 comprises a core 20 for executing a sequence of instructions. The core 20 has access to one or more caches 24, which in one embodiment may comprise an instruction cache and a separate data cache. Other local cache structures may also be provided, such as the TLB 28 referenced by the memory management unit (MMU) 26 when performing memory access control operations, such as virtual to physical address translations.

Maintenance circuitry 22 is also provided for performing maintenance operations in respect of the local cache structures, in this example the cache 24 and the TLB 28. In one embodiment, the maintenance circuitry 22 can be considered to form part of the processor core 20, and for example may be considered to form one of the execution pipelines provided by the core 20. The processor 10 also includes one or more configuration registers 30 used to configure the operation of the processor. In accordance with the embodiments of the present invention, the information stored in this configuration register 30 includes an access operation extension value which the maintenance circuitry 22 references when performing cache maintenance operations. In particular, as will be described in more detail later, dependent on the value of the access operation extension value, the maintenance circuitry will alter how it handles cache maintenance operations specified as local operations.

In the illustrated embodiment, the processor 40 is constructed in an identical manner to the processor 10, and accordingly includes core 50, maintenance circuitry 52, cache 54, TLB 58 within the MMU 56, and one or more configuration registers 60.

The various processing units 10, 40 are connected via a coherent interconnect 70 with shared memory 75. The coherent interconnect 70 ensures that the data stored in the various local cache structures is maintained coherent, so that each processor has the same view of the data. Hence, by way of example, if core 50 issues a data access request which misses in its data cache 54, this will cause a request to be issued to the coherent interconnect 70, which will then determine whether the required data is stored within the corresponding data cache 24 of the processing unit 10. If so, that data will be retrieved from the data cache of the processing unit 10, and provided to the processing unit 40. Dependent on the coherency protocol used by the coherent interconnect 70, the relevant data in the data cache of the processing unit 10 may be marked as invalid, or alternatively both processing units 10, 40 may mark their copies of the data as shared. This will then influence how subsequent access operations performed in respect of that data are handled. Only if the data being requested cannot be found in one of the other caches is the data then accessed from memory 75.

Whilst such techniques generally operate well to maintain the coherency of data, problems can arise when the operating system and underlying applications executing on the hardware are unaware of the multi-processor nature of the hardware, such as may occur when using hypervisor software to allow execution of multiple virtual machines. In particular, as shown in FIG. 1, hypervisor software 80 may be executed on the hardware platform consisting of the multiple processing units 10, 40 to support the execution of at least one virtual machine 90 on the processing circuitry. Each virtual machine will consist of an operating system 92 running one or more applications programs 94, 96. As will be discussed in more detail below, the techniques of the embodiments of the present invention can be used when only a single virtual machine 90 is being run by the hypervisor 80, or alternatively there may be more than one virtual machine whose execution is being supported by the hypervisor software. Accordingly, a shown in the dotted box, at least one further virtual machine 100 may be provided consisting of an operating system 102 running a number of application programs 104, 106.

During operation, the hypervisor software 80 may migrate a virtual machine from one processing unit to another, for example when seeking to increase performance taking account of the current loading of each processing unit 10, 40. Due to the shielding of the underlying hardware from the virtual machine by the hypervisor software 80, the virtual machine 90 will typically be unaware of which processing unit 10, 40 it is running on, and further will typically be unaware when its operation is switched from one processing unit to another. Accordingly, the operating system 92 and/or the application programs 94, 96 may issue cache maintenance operations which are specified to be local cache maintenance operations, since the virtual machine expects that the data the subject of those cache maintenance operations will be stored in a local cache structure. However, if between the time the data is initially stored in the cache structure and the time the cache maintenance operation is issued, the virtual machine has been migrated from one processing unit to another, then this premise may not be correct and could potentially lead to incorrect operation due to not all of the data the subject of the cache maintenance operation being subjected to that cache maintenance operation.

The presence of the coherent interconnect 70, and the marking of particular cache entries as shared, is not in itself sufficient to ensure that problems do not arise. For example, consider the situation where a virtual machine writes ten data values to a cache, with three of those data values getting written into the cache 24 of processing unit 10 whilst the virtual machine 90 is executing on the processing unit 10, but with the hypervisor then switching execution of the virtual machine 90 to the processing unit 40, such that the remaining seven data values get written in the data cache 54. If a cache maintenance operation is then issued to clean a range of addresses including the addresses of those ten data values, with the virtual machine 90 still operating on the processing unit 40, it will be seen that the seven data values in the cache 54 will be located in the cache, and the necessary clean operation performed. If those entries are marked as shared, then a signal will also be issued to the coherent interconnect 70 to ensure that any other copies of that data are invalidated. However, for the other three data values in question, the locally performed cache maintenance operation within the processing unit 40 will merely detect cache misses in respect of those associated addresses, and accordingly will take no further action (instead it being assumed that that data has already been evicted to memory). However, as a result, those three data values will still be resident within the cache 24, and will not have been cleaned, with the result that the shared memory 75 will be out-of-date in respect of those data values. This may cause incorrect operation of the virtual machine.

In accordance with embodiments of the present invention, this problem is addressed through the provision of the access operation extension bit, which can be set by software at a particular hierarchical level, and once set will then influence how local cache maintenance operations issued by software at a lower level in the hierarchy are handled. Hence, in one embodiment, the access operation extension bit may be allowed to be set by the operating system 92, such that any subsequent cache maintenance operations issued by the applications 94, 96 will be handled differently dependent on whether the operating system has set the access operation extension bit or not. However, for the purposes of the following discussion, it will be assumed that the access operation extension bit is settable by the hypervisor software 80, such that any cache maintenance operations issued by the virtual machine (whether by the operating system 92 or one of the application programs 94, 96) will then be handled differently dependent on whether the access operation extension bit has been set or not.

Figure 2:
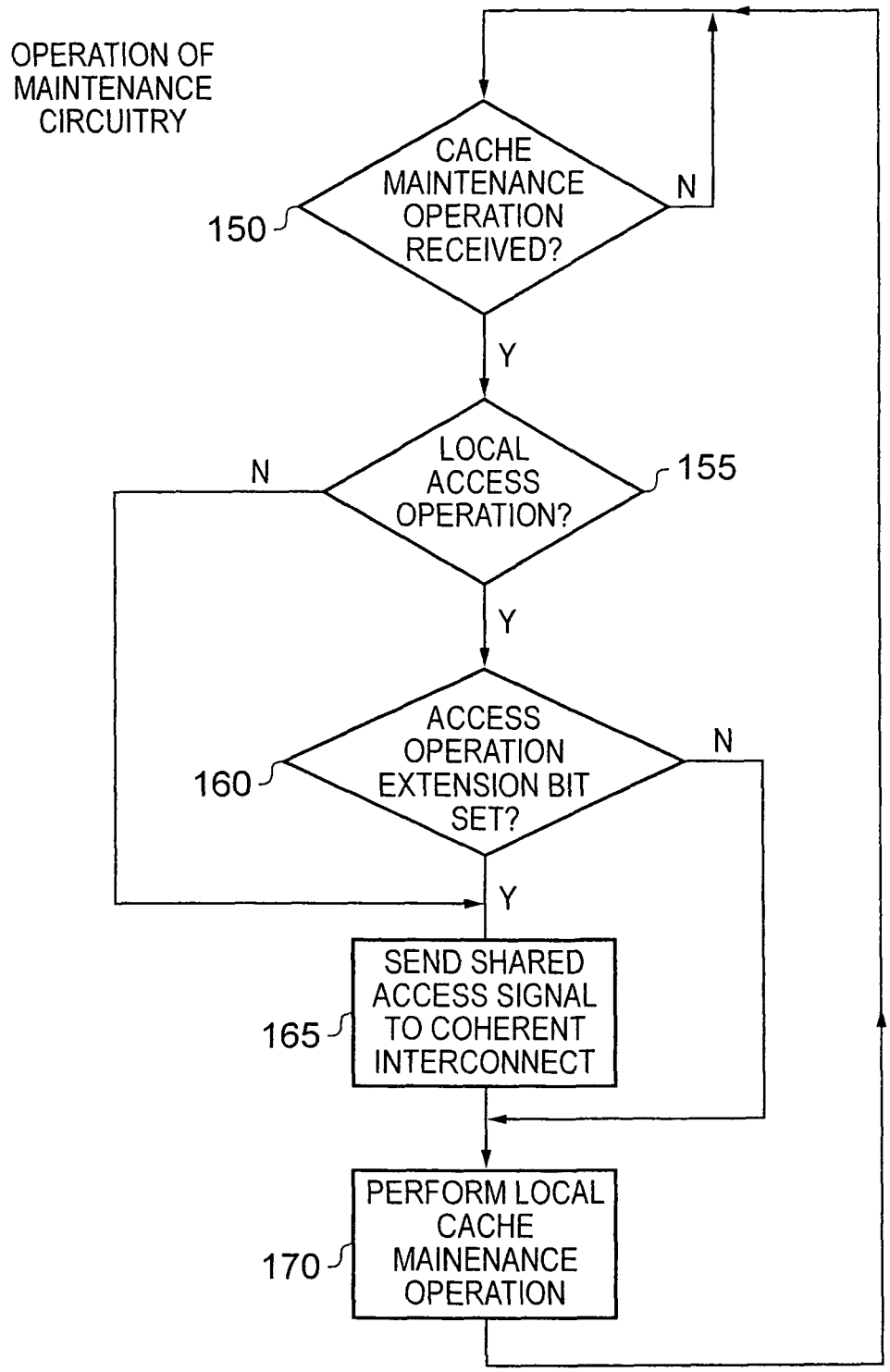
FIG. 2 is a flow diagram illustrating how cache maintenance operations are handled in accordance with one embodiment.

FIG. 2 is a flow diagram illustrating how the handling of local cache maintenance operations is influenced by the value of the access operation extension bit in accordance with one embodiment. In particular, at step 150, the maintenance circuitry awaits receipt of a cache maintenance operation. Once the cache maintenance operation has been received, it is determined at step 155 whether that cache maintenance operation is a local access operation or not. If it is not, then the process proceeds to steps 165 where a shared access signal is sent to the coherent interconnect to cause local access operations to be performed on one or more other processing units, and in addition a local cache maintenance operation will be performed at step 170 in respect of the local cache structure associated with the maintenance circuitry receiving the cache maintenance operation at step 150.

It should be noted that whilst steps 165 and 170 are shown sequentially, they may be performed in the opposite order, or indeed may be performed in parallel. Further, in some embodiments, the local cache maintenance operation performed at step 170 may be performed without having regard to the result of the performance of the corresponding local cache maintenance operations on any of the other processing units in response to the shared access signal. However, in an alternative embodiment, the performance of the local cache maintenance operation at step 170 may be delayed until the various other processing units have performed their local cache maintenance operations in response to the shared access signal issued at step 165 to the coherent interconnect.

If at step 155, it is determined that the cache maintenance operation is a local access operation, then it is determined at step 160 whether the access operation extension bit has been set. If not, then the cache maintenance operation is merely treated as a local operation, and accordingly the local cache maintenance operation is performed at step 170. However, if the access operation extension bit is determined to be set at step 160, then the local access operation is actually treated as a shared access operation. Accordingly, steps 165 and 170 are performed. As a result, it will be seen that when the access operation extension bit is set, a cache maintenance operation specified as being a local access operation is "upgraded" to be treated as a shared access operation. This hence ensures that the cache maintenance operation is performed in all of the relevant cache structures irrespective of which processing unit the virtual machine is currently executing on.

Figure 3:
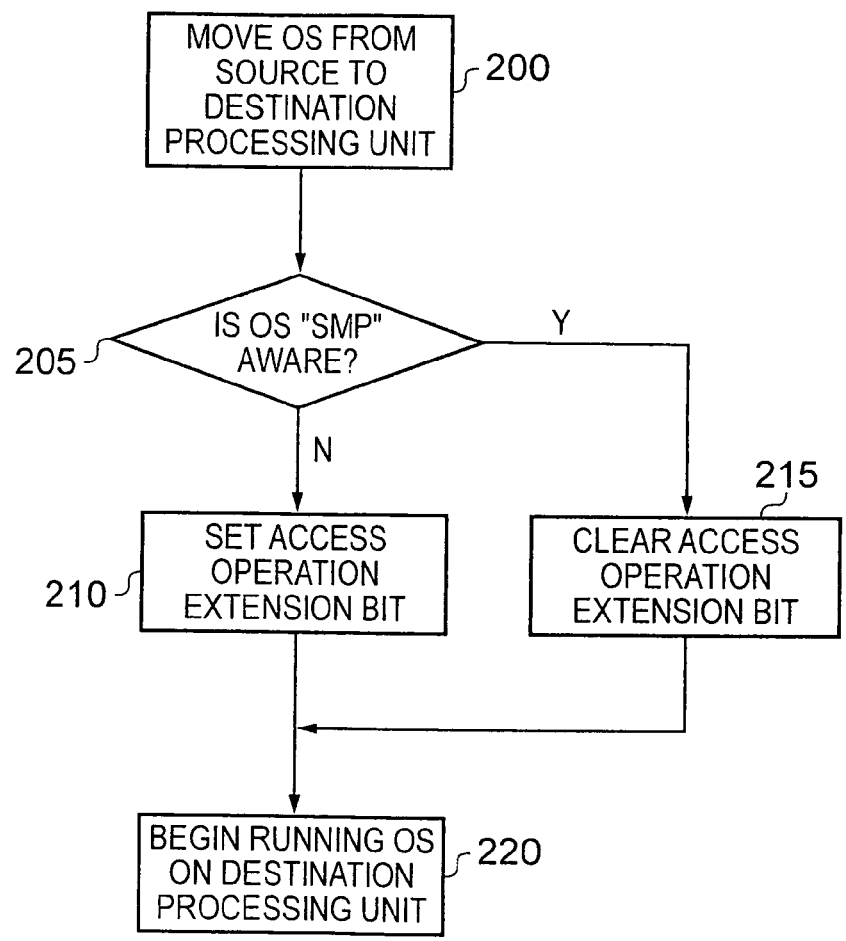
FIG. 3 is a flow diagram illustrating how the hypervisor may set the access operation extension bit in accordance with one embodiment.

FIG. 3 is a flow diagram illustrating how the hypervisor software 80 determines when to set the access operation extension bit in accordance with one embodiment. At step 200, the hypervisor moves an operating system from a source processing unit to a destination processing unit. During this process, the hypervisor software determines at step 205 whether the operating system is multi-processor aware, in this example "SMP aware" since it is assumed that the hardware is SMP processing circuitry. If the operating system is not SMP aware, then the process proceeds to step 210 where the access operation extension bit is set, whereas if the operating system is SMP aware, then the access operation extension bit is cleared at step 215. Following steps 210 or 215, then the hypervisor allows the operating system to begin running on the destination processing unit at step 220.

In the embodiment described with reference to FIG. 3, it is assumed that if the operating system is SMP aware, then it will issue cache maintenance operations which will correctly be identified as shared or local. However, in an alternative embodiment, the hypervisor may merely be arranged to set the access operation extension bit each time it moves an operating system from one processing unit to another, irrespective of whether that operating system is SMP aware or not. This could for example be useful if an SMP-enabled operating system has been optimised in a way where it understands which processor an operation should be run on, since this knowledge may potentially be wrong when the operating system runs underneath a hypervisor layer.

Figure 4A:
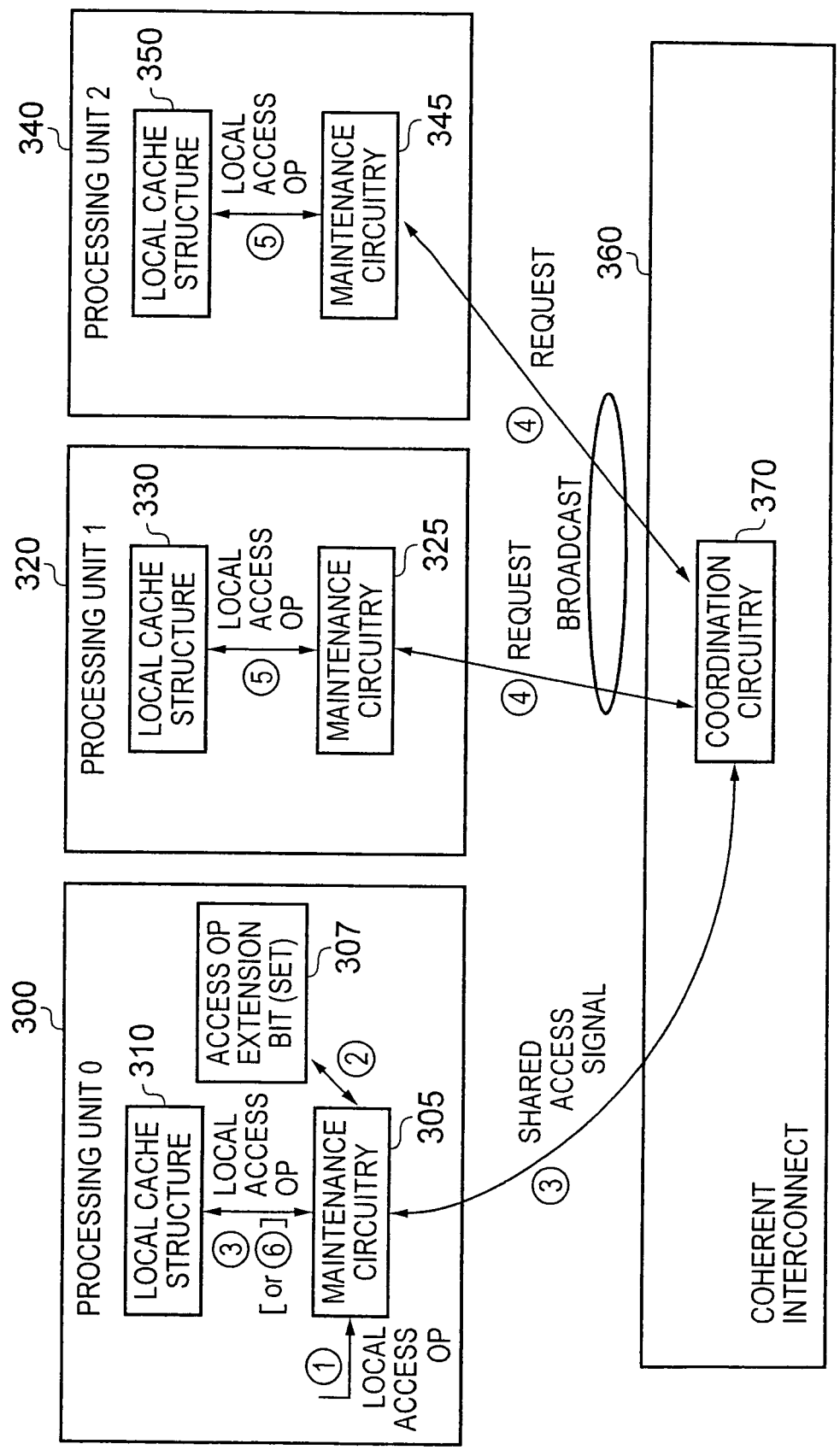
FIG. 4A schematically illustrates the handling of a local access operation in the event that the access operation extension bit is set, in accordance with one embodiment.

FIG. 4A schematically illustrates how a local access operation is handled in accordance with one embodiment. For the purposes of this example, it is assumed that the multi-processing system provides three processing units 300, 320, 340. For the purposes of illustration, only the relevant internal structures of those processing units are shown. Accordingly, each processing unit 300, 320, 340 has associated maintenance circuitry 305, 325, 345 which is coupled with one or more local cache structures 310, 330, 350, respectively. An access operation extension bit 307 is shown in respect of processing unit 300, it being assumed in this instance that that access operation extension bit is set. The numbers provided in circles against the various signal lines then indicate a sequence that occurs upon receipt by the maintenance circuitry 305 of a local access operation. Accordingly, as shown, once a local access operation is received by the maintenance circuitry 305, it references the access operation extension bit 307, which in this instance it finds is set. Accordingly, the maintenance circuitry 305 then performs a local access operation to its associated local cache structure 310 whilst also issuing a shared access signal to the coordination circuitry 370 within the coherent interconnect 360. In this example, the coordination circuitry merely broadcasts a request to each of the other processing units upon receipt of the shared access signal, and accordingly both the maintenance circuitry 325 and the maintenance circuitry 345 receive requests to perform a local access operation. Hence, as shown in FIG. 4A, both maintenance circuits 325, 340 then perform their local access operations in respect of their associated local cache structures 330, 350, respectively.

Whilst the performance of the local access operation in respect of the local cache structure 310 may be entirely decoupled from the process of issuing a shared access signal to the coordination circuitry and the subsequent other local access operations, in one embodiment the maintenance circuit 305 may defer performing its local access operation until all of the other local access operations have been performed and the results of those local access operations returned to the maintenance circuitry 305 via the coordination circuitry 370. Accordingly, as shown by the number 6 in a circle adjacent to the local access operation signal path between the maintenance circuitry 305 and the local cache structure 310, that local access operation may be performed after the other operations have completed.

Figure 4B:
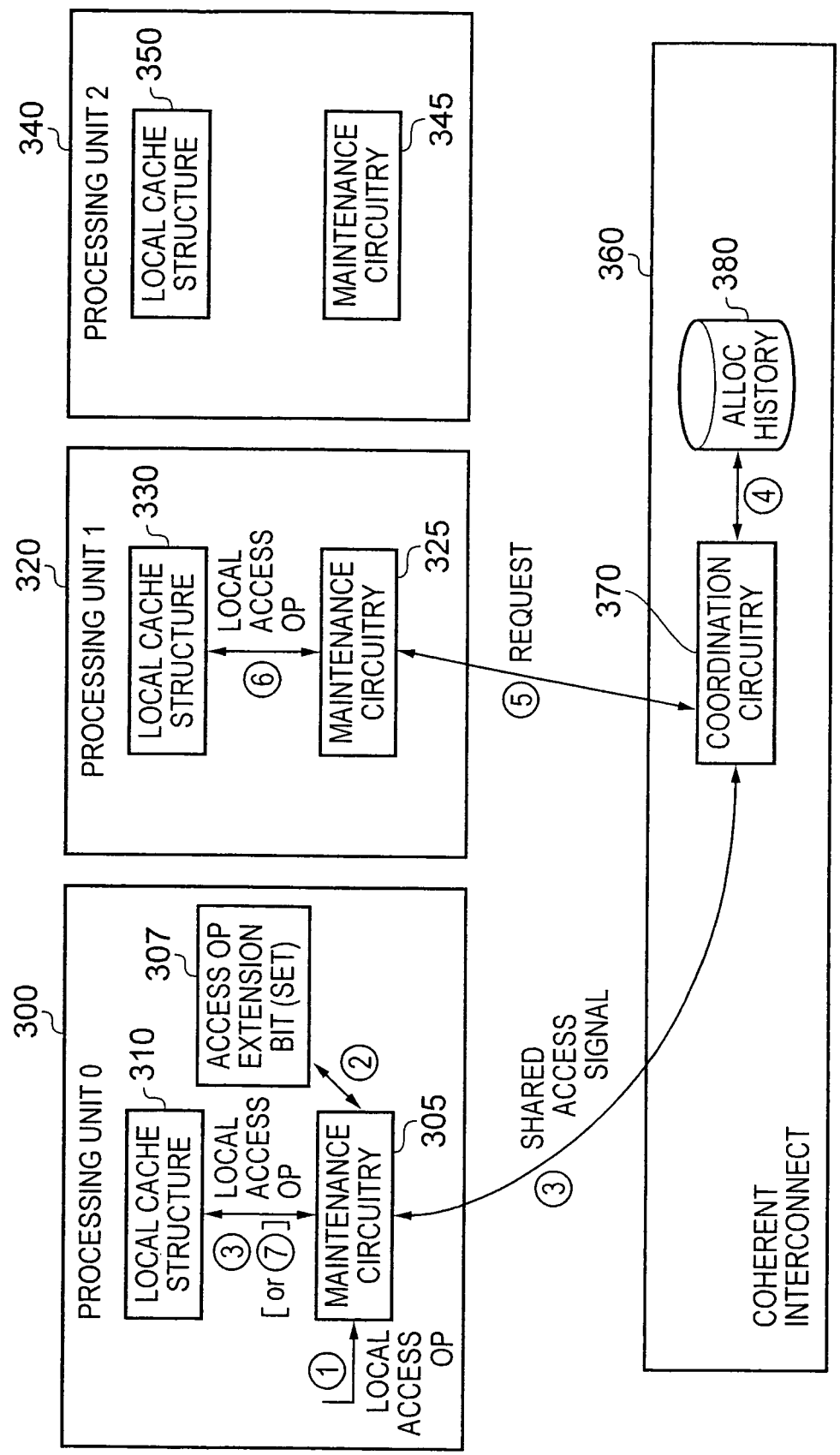
FIG. 4B schematically illustrates the handling of a local access operation in the event that the access operation extension bit is set, in accordance with an alternative embodiment.

FIG. 4B illustrates an alternative embodiment where the coordination circuitry 370 retains history data which enables it to determine which other processing units to issue requests to upon receipt of the shared access signal. In the particular example illustrated in FIG. 4B, it is assumed that the coordination circuitry 370 maintains a history 380 of allocation data to the local cache structures. Accordingly, when the shared access signal is received by the coordination circuitry 370, the coordination circuitry can consider the data address identified by the shared access signal, and with reference to the allocation history 380 may determine which of the local cache structures 330, 350 have previously cached data at that address. In the example illustrated, the coordination circuitry 370 determines that local cache structure 330 has previously cached data at that address, but the local cache structure 350 has not. Accordingly, the request is only issued to the maintenance circuitry 325 and not to the maintenance circuitry 345.

The coordination circuitry 370 may take a variety of forms, but in one embodiment will be formed by a snoop control unit used to perform snoop operations as required by a cache coherency protocol. Its functions can be extended to allow correct operation of maintenance operations not only issued in respect of data caches, but also instruction caches, TLBs, etc.

Figure 5:
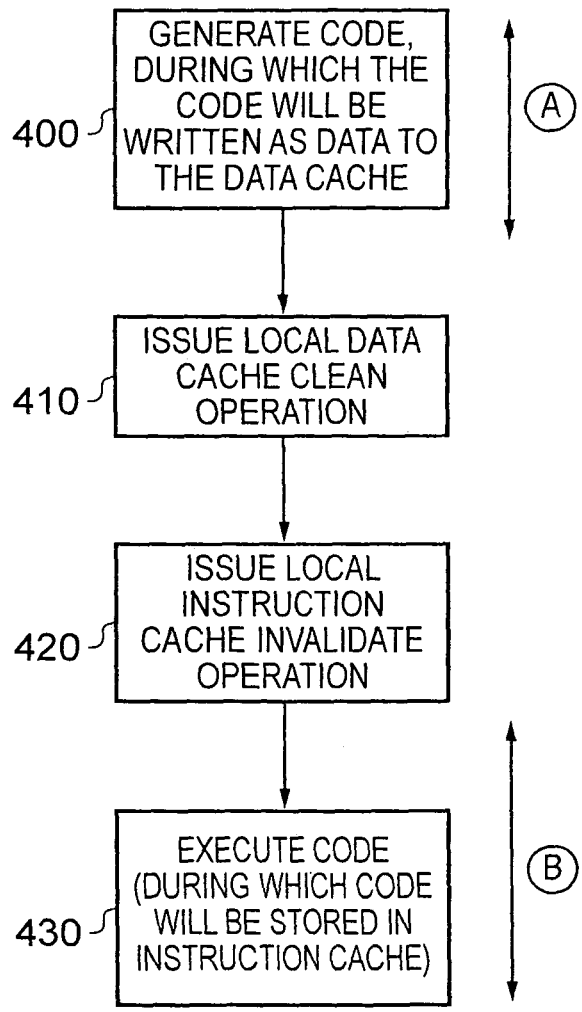
FIG. 5 is a flow diagram illustrating a code generation process where problems that might arise due to migration from one processing unit to another are avoided through use of the technique of one embodiment.

FIG. 5 is a flow diagram illustrating a particular sequence of operations that may be performed by a virtual machine. In particular, at step 400, some code is generated, during which time that code will typically be written as data into the data cache. However, before that code can be executed, it first needs to be stored out to memory and then retrieved into the instruction cache. Accordingly, at step 410, a local data cache clean operation is issued, and at step 420 a local instruction cache invalidate operation is issued. The local data cache clean operation 410 will result in valid and dirty data within the data cache being evicted to memory, whilst the local instruction cache invalidate operation will ensure that any instructions which may have been updated by the code generating step 400 will be invalidated so that they are not then incorrectly referenced when execution of the new code begins. Accordingly, at step 430, when the new code is executed, the correct instructions will be retrieved from memory, and will typically be stored in the instruction cache.

If the above described technique of embodiments of the present invention were not utilised, then there are periods of time during which a switch of the virtual machine's execution from one processing unit to another could cause incorrect operation. In particular, if during the period of time A shown in FIG. 5 (which begins some time after the code generation process starts and ends before the local data cache clean operation is issued at step 410) the virtual machine is switched from a first processing unit to a second processing unit, then when the local data cache clean operation is subsequently issued, it will only clean the data which is stored in the data cache of the second processing unit. This may leave some newly generated code remaining in the data cache of the first processing unit, without that data having been cleaned. However, through use of the above described techniques, the upgrading of the local data cache clean operation issued at step 410 to a shared data cache clean operation will ensure that all the required entries get cleaned, irrespective of whether those entries are within the data cache of the second processing unit or the data cache of the first processing unit.

Similarly, during the time period B, a problem could arise if the execution of the virtual machine is switched back from the second processing unit to the first processing unit. In that example, without the use of the present invention, the local instruction cache of the first processing unit will not have been invalidated at step 420, and accordingly incorrect instructions may be executed at step 430. However, through use of the techniques described earlier, the local instruction cache invalidate operation will be upgraded at step 420 to a shared instruction cache invalidate operation, ensuring that the relevant entries in both instruction caches get invalidated.

Figure 6:
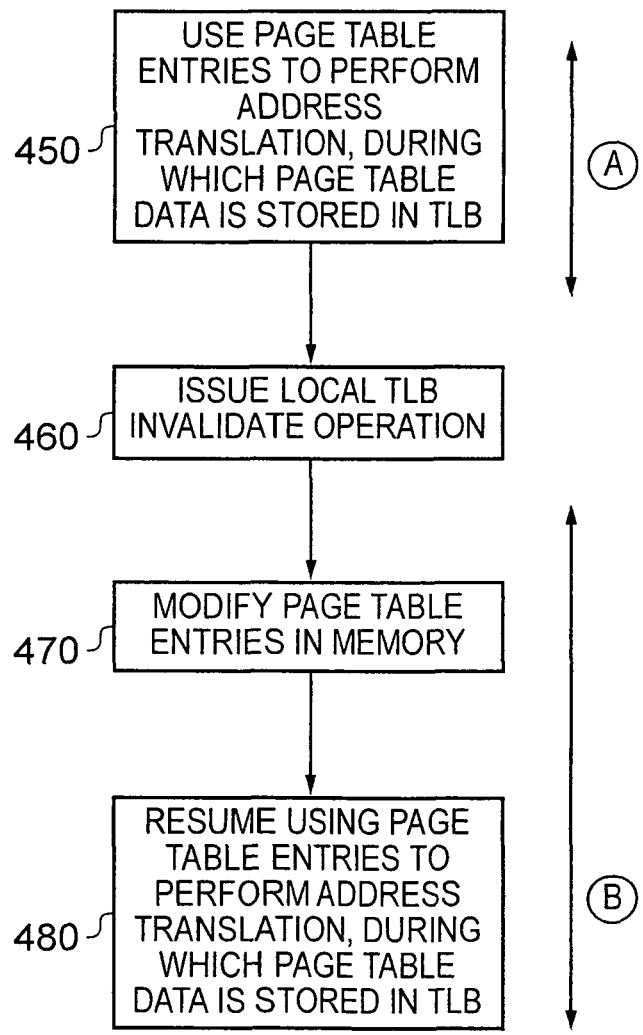
FIG. 6 is a flow diagram illustrating a page table update process, where a problem that could arise due to migration from a first processing unit to a second processing unit, and later back to the first processing unit, is avoided through use of the technique of one embodiment.

FIG. 6 is a flow diagram illustrating a page table update process. In particular, at step 450, page table entries are used to perform address translation, during which time page table entries will typically be stored within the TLB of the MMU. Subsequently, there is need to update the page table entries. Accordingly, a local TLB invalidate operation is issued at step 460 to invalidate any cached entries in the TLB that are about to be updated. Thereafter, the relevant page table entries are modified at step 470. Subsequently, the process resumes at step 480 using page table entries to perform address translation, during which time page table data will again be stored in the TLB from the memory. If such a process is run on a single processing unit, then no problem will arise. However, if the operation of the virtual machine is switched from a first processing unit to a second processing unit some time during the time interval A shown in FIG. 6, and then subsequently the execution of the virtual machine is switched back from the second processing unit to the first processing unit some time during the time interval B, then a problem could arise if the technique of embodiments of the present invention is not utilised. In particular, due to the switch that occurs during time period A, it will be appreciated that the local TLB invalidate operation at step 460 would not invalidate the relevant page table entries in the TLB of the first processing unit. This means that when execution is subsequently returned to the first processing unit during the time period B, hits may occur within the TLB due to the presence of outdated data still being retained within the TLB of the first processing unit. However, through use of the earlier described techniques of embodiments of the present invention, this problem does not arise, since the local TLB invalidate operation issued at step 460 is upgraded to a shared TLB invalidate operation, and accordingly the relevant entries in both TLBs are invalidated.

Figure 7:
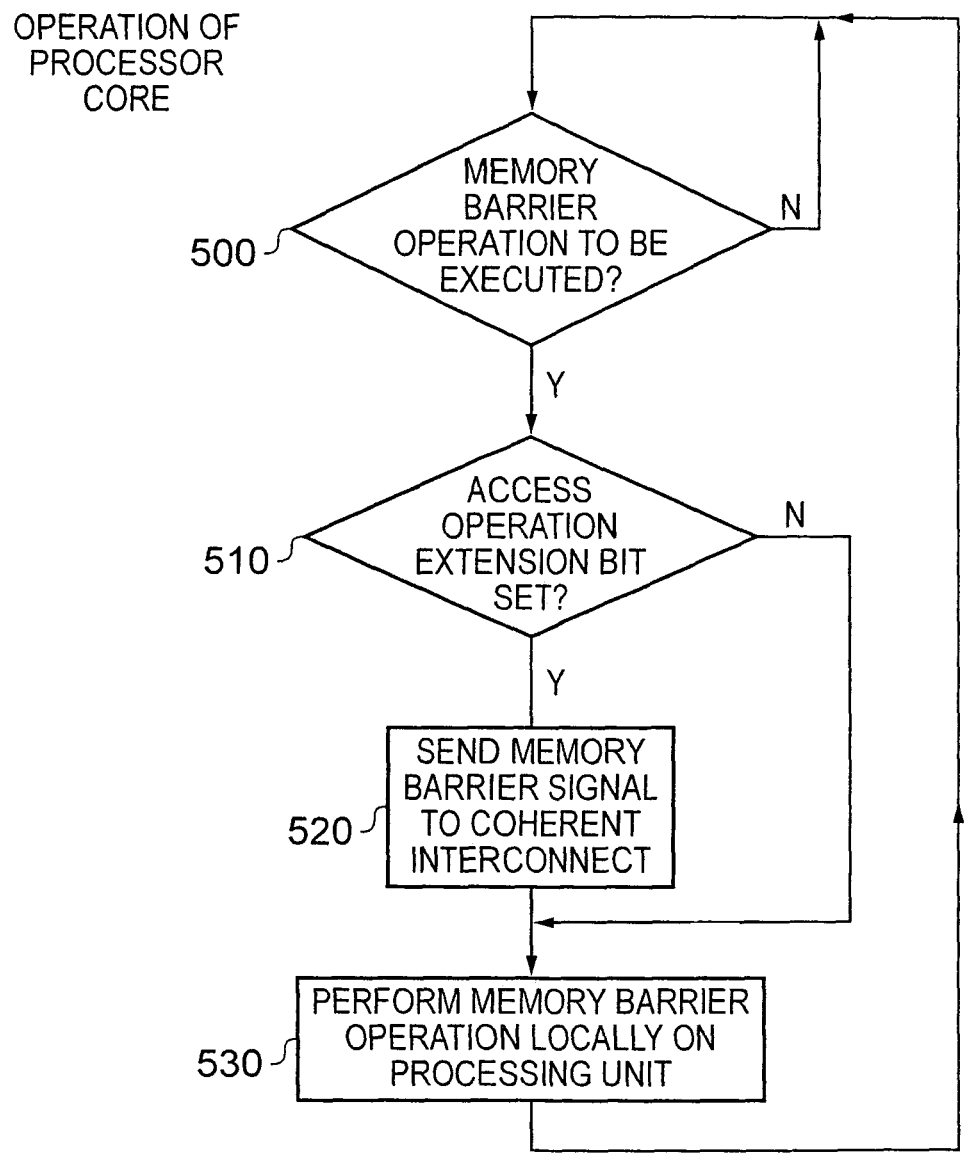
FIG. 7 is a flow diagram illustrating how memory barrier operations may be handled in accordance with one embodiment.

Whilst the techniques of embodiments of the present invention have up until now been described in association with the handling of cache maintenance operations, they can also be used to ensure correct operation of memory barrier operations, as will be discussed further with reference to FIGS. 7 and 8. As will be understood by those skilled in the art, if a program wants to ensure that a previous memory operation such as a write operation has its results made visible to some other agent in the system, or to ensure that that previous memory operation has been completed before any subsequent memory operations are started, then a memory barrier operation may be performed. Accordingly, as shown at step 500 of FIG. 7, it is determined whether a memory barrier operation is to be executed, and whenever it is determined that a memory barrier operation is to be executed, then it is determined at step 510 whether the access operation extension bit is set. If not, the memory barrier operation is merely performed locally on the processing unit on which the virtual machine is currently executing at step 530. However, if the access operation extension bit is set, then a memory barrier signal 520 is issued to the coherent interconnect at step 520, and the memory barrier operation is performed locally at step 530. The coherent interconnect will then cause appropriate requests to be issued to the other processing units to cause them to also execute the memory barrier operation locally. The benefit of such an approach can be seen when we consider the example sequence of events shown in FIG. 8.

In particular, at step 550, a write operation is performed where the write data gets buffered. In particular, in many systems, the write operation is considered to have been completed when the write data is placed in a write buffer, and it may in fact be many cycles later before that write buffer is drained and the write data actually becomes committed to memory.

Figure 8:
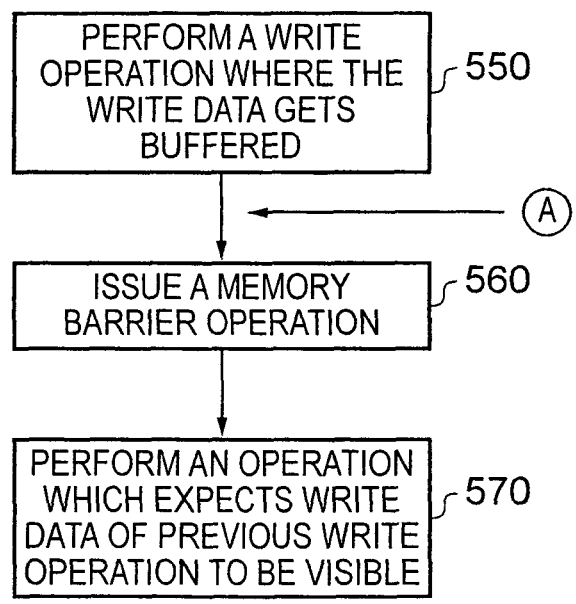
FIG. 8 is a flow diagram illustrating a sequence of operations involving a memory barrier operation, where a problem that could arise through switching from one processing unit to another is avoided through use of the technique of one embodiment.

Accordingly, if it is important for that write data to be visible to some following operation, then it is common to issue a memory barrier operation following the write operation, as shown by the step 560 in FIG. 8. Thereafter, when an operation is performed at step 570 which expects the write data of the previous write operation to be visible, the memory barrier operation performed at step 560 will ensure that that write data is indeed visible to that operation. However, if the execution of the virtual machine is switched from one processing unit to another at time A shown in FIG. 8, then it will be appreciated that the memory barrier operation 560 will not achieve its aim unless the technique of embodiments of the present invention is employed, since it will be applied locally within the processing unit on which the virtual machine is then executing, whereas the write data will actually be held in the write buffer of a different processing unit. However, through use of the techniques of embodiments of the present invention, the memory barrier operation issued at step 560 will be upgraded to a shared memory barrier operation, causing the memory barrier operation to be performed on both processing units, and accordingly causing the write data to be drained to memory, and to then be visible when the subsequent operation is performed at step 570.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   processing circuitry comprising a plurality of processing units for performing data processing operations requiring access to data in shared memory, said processing circuitry configured to execute software consisting of a plurality of hierarchical levels of software;
   each processing unit having a local cache structure associated therewith for storing a subset of said data for access by that processing unit, and access control circuitry for handling access operations issued to the local cache structure, at least one type of access operation to the local cache structure being issued as a local access operation or a shared access operation;
   a configuration storage for storing an access operation extension value, wherein the access operation extension value is set and unset by software executing at a predetermined hierarchical level;
   shared access coordination circuitry for coordinating the handling of said shared access operation by said plurality of processing units;
   on receipt of said shared access operation, the access control circuitry issuing a shared access signal to the shared access coordination circuitry in addition to performing the local access operation to the associated local cache structure;
   on receipt of said local access operation, if said local access operation has been issued by software at a lower hieratrchical level than said predetermined hierarchical level, the access control circuitry is configured, if the access operation extension value is not set, to perform the local access operation to the associated local cache structure without issuing the shared access signal to the shared access coordination circuitry, and, if the access operation extension value is set, to treat the local access operation as said shared access operation.

2. A data processing apparatus as claimed in claim 1, wherein said at least one type of access operation comprises a maintenance access operation issued to update a state of data stored in at least one entry of the local cache structure.

3. A data processing apparatus as claimed in claim 2, wherein said maintenance access operation performs at least one of a clean operation and an invalidate operation in respect of said at least one entry of the local cache structure.

4. A data processing apparatus as claimed in claim 1, wherein the processing circuitry executes hypervisor software to support the execution of at least one virtual machine on the processing circuitry, the virtual machine being arranged to issue said at least one type of access operation.

5. A data processing apparatus as claimed in claim 4, wherein each of said at least one virtual machine comprises an operating system running one or more application programs.

6. A data processing apparatus as claimed in claim 5, wherein when the hypervisor software moves said operating system from a first one of said plurality of processing units to a second one of said plurality of processing units, the hypervisor software causes said access operation extension value to be set.

7. A data processing apparatus as claimed in claim 6, wherein following setting of the access operation extension value, the access control circuitry treats any local access operation issued by said at least one virtual machine as said shared access operation, but continues to handle local access operations issued by the hypervisor software as local access operations.

8. A data processing apparatus as claimed in claim 1, wherein said local cache structure is a data cache for caching data used as operand data for said data processing operations.

9. A data processing apparatus as claimed in claim 1, wherein said local cache structure comprises a translation lookaside buffer for caching page table data obtained from page tables in said shared memory and used when performing virtual to physical address translation within the associated processing unit.

10. A data processing apparatus as claimed in claim 1, wherein said local cache structure is an instruction cache for caching instructions used to define said data processing operations.

11. A data processing apparatus as claimed in claim 1, wherein said shared access coordination circuitry is responsive to said shared access signal to broadcast a local access operation request to each of the processing units other than the processing unit whose access control circuitry has issued said shared access signal, whereby the local access operation is performed on each of the processing units.

12. A data processing apparatus as claimed in claim 1, wherein said shared access coordination circuitry is responsive to said shared access signal to determine a subset of processing units from said plurality of processing units whose local cache structure could contain data identified by the shared access operation, and to issue a local access operation request to each of the processing units in said subset.

13. A data processing apparatus as claimed in claim 1, wherein on execution of a memory barrier operation by a first one of said processing units, said first one of said processing units is arranged, if said access operation extension value is set, to issue a memory barrier signal to cause said memory barrier operation to be executed on at least one other of said processing units.

14. A data processing apparatus as claimed in claim 13, wherein said first one of said processing units issues said memory barrier signal to said shared access coordination circuitry to cause said memory barrier operation to be executed on said at least one other of said processing units.

15. A data processing apparatus as claimed in claim 1, wherein said shared access coordination circuitry comprises cache coherency circuitry employing a cache coherency protocol to ensure that said data accessed by each processing unit is up-to-date.

16. A data processing apparatus as claimed in claim 1, wherein said configuration storage stores a separate access operation extension value for each processing unit in said plurality of processing units, and the access control circuitry references its associated access operation extension value when handling the local access operation.

17. A data processing apparatus as claimed in claim 1, wherein said plurality of processing units form a plurality of processors of a symmetric multiprocessing (SMP) processing circuitry.

18. A method of handling access operations issued to local cache structures within a data processing apparatus, the data processing apparatus configured to execute software consisting of a plurality of hierarchical levels of software, the data processing apparatus having a plurality of processing units for performing data processing operations requiring access to data in shared memory, each processing unit having a local cache structure associated therewith for storing a subset of said data for access by that processing unit, the method comprising:
- providing shared access coordination circuitry for coordinating the handling of a shared access operation by said plurality of processing units;
- storing an access operation extension value, wherein the access operation extension value is set and unset by software executing at a predetermined hierarchical level;
- when handling said shared access operation issued to one of the local cache structures, issuing a shared access signal to the shared access coordination circuitry in addition to performing a local access operation to said one of the local cache structures;
- when handling a local access operation issued to one of the local cache structures if said local access operation has been issued by software at a lower hierarchical level than said predetermined hierarchical level:
  - (i) if the access operation extension value is not set, performing the local access operation to said one of the local cache structures without issuing the shared access signal to the shared access coordination circuitry, and
  - (ii) if the access operation extension value is set, treating the local access operation as said shared access operation.

19. A data processing apparatus comprising:
- processing means for executing software consisting of a plurality of hierarchical levels of software, said processing means comprising a plurality of processing unit means for performing data processing operations requiring access to data in shared memory;
- each processing unit means having local cache structure means associated therewith for storing a subset of said data for access by that processing unit means, and access control means for handling access operations issued to the local cache structure means, at least one type of access operation to the local cache structure means is issued as a local access operation or a shared access operation;
- configuration storage means for storing an access operation extension value, wherein the access operation extension value is set and unset by software executing at a predetermined hierarchical level;
- shared access coordination means for coordinating the handling of said shared access operation by said plurality of processing unit means;
- on receipt of said shared access operation, the access control means issuing a shared access signal to the shared access coordination means in addition to performing the local access operation to the associated local cache structure means;
- on receipt of said local access operation, if said local access operation has been issued by software at a lower hierarchical level than said predetermined hierarchical level, the access control means, if the access operation extension value is not set, performs the local access operation to the associated local cache structure means without issuing the shared access signal to the shared access coordination means, and, if the access operation extension value is set, treats the local access operation as said shared access operation.

* * * * *